(12) United States Patent
Chen

(10) Patent No.: US 10,710,707 B2
(45) Date of Patent: *Jul. 14, 2020

(54) UNMANNED AERIAL VEHICLE

(71) Applicant: AUTEL ROBOTICS CO., LTD., Shenzhen, Guangdong (CN)

(72) Inventor: Yong Chen, Guangdong (CN)

(73) Assignee: AUTEL ROBOTICS CO., LTD, Shenzhen (CN)

(*) Notice: Subject to any disclaimer, the term of this patent is extended or adjusted under 35 U.S.C. 154(b) by 126 days.

This patent is subject to a terminal disclaimer.

(21) Appl. No.: 15/850,450

(22) Filed: Dec. 21, 2017

(65) Prior Publication Data
US 2018/0134376 A1 May 17, 2018

Related U.S. Application Data

(63) Continuation of application No. PCT/CN2017/107360, filed on Oct. 23, 2017.

(30) Foreign Application Priority Data

Oct. 28, 2016 (CN) .......................... 2016 1 0962576

(51) Int. Cl.
*B64C 25/08* (2006.01)
*B64C 39/02* (2006.01)

(52) U.S. Cl.
CPC ............ *B64C 25/08* (2013.01); *B64C 39/024* (2013.01); *B64C 2201/027* (2013.01); *B64C 2201/123* (2013.01); *B64C 2201/18* (2013.01)

(58) Field of Classification Search
CPC ........ B64C 2201/027; B64C 2201/123; B64C 2201/18; B64C 2201/141; B64C 25/08; B64C 39/024; G05D 1/102
See application file for complete search history.

(56) References Cited

U.S. PATENT DOCUMENTS 5,708,469 A * 1/1998 Herzberg ............... H04N 5/232
348/37
9,421,869 B1 * 8/2016 Ananthanarayanan ......................
B60L 5/005
(Continued)

FOREIGN PATENT DOCUMENTS

CN 103231800 A 8/2013
CN 104787307 A 7/2015
(Continued)

OTHER PUBLICATIONS

Supplementary European Search Report dated May 29, 2018; Appln. No. EP 17 81 4296.
(Continued)

*Primary Examiner* — Medhat Badawi

(57) ABSTRACT

An unmanned aerial vehicle includes: a vehicle body, where the vehicle body includes a first positioning device; and a landing gear, where the landing gear can be detached from the vehicle body, and when the landing gear is detached from the vehicle body, the vehicle body determines a position of the landing gear by using the first positioning device. Because the landing gear can be detached from the vehicle body and the vehicle body can determine the position of the landing gear by using the first positioning device, the unmanned aerial vehicle, when performing a flight mission, is not affected by the weight of the landing gear, avoiding that the landing gear blocks an image capture device and implementing convenient takeoff and landing.

14 Claims, 2 Drawing Sheets

(56) References Cited

U.S. PATENT DOCUMENTS

| | | | | |
|---|---|---|---|---|
| 9,551,989 B2* | 1/2017 | Scarlatti | | B64C 39/024 |
| 9,573,701 B2* | 2/2017 | Beardsley | | B60L 53/37 |
| 10,099,561 B1* | 10/2018 | Ananthanarayanan | | |
| | | | | B64C 39/024 |
| 10,336,202 B2* | 7/2019 | Panopoulos | | F21V 14/02 |
| 2005/0125119 A1* | 6/2005 | Srack | | G01B 5/0025 |
| | | | | 702/152 |
| 2007/0025809 A1* | 2/2007 | Lee | | B64F 1/06 |
| | | | | 403/119 |
| 2009/0216394 A1* | 8/2009 | Heppe | | B64C 39/024 |
| | | | | 701/16 |
| 2009/0224097 A1* | 9/2009 | Kariv | | B64F 1/02 |
| | | | | 244/63 |
| 2009/0236470 A1* | 9/2009 | Goossen | | B64C 39/024 |
| | | | | 244/115 |
| 2009/0306840 A1* | 12/2009 | Blenkhorn | | G05D 1/0676 |
| | | | | 701/16 |
| 2010/0193626 A1* | 8/2010 | Goossen | | B64C 37/00 |
| | | | | 244/2 |
| 2011/0024559 A1* | 2/2011 | McGeer | | B64C 25/68 |
| | | | | 244/110 F |
| 2011/0068224 A1* | 3/2011 | Kang | | B64C 39/024 |
| | | | | 244/116 |
| 2011/0174925 A1* | 7/2011 | Ying | | B64F 1/005 |
| | | | | 244/114 R |
| 2012/0277934 A1* | 11/2012 | Ohtomo | | G05D 1/0669 |
| | | | | 701/15 |
| 2015/0069968 A1* | 3/2015 | Pounds | | B60L 11/1818 |
| | | | | 320/109 |
| 2016/0144982 A1* | 5/2016 | Sugumaran | | B64C 25/32 |
| | | | | 244/103 R |
| 2016/0257424 A1* | 9/2016 | Stabler | | A63H 27/12 |
| 2016/0304217 A1* | 10/2016 | Fisher | | B64C 39/024 |
| 2017/0192422 A1* | 7/2017 | Kim | | G03B 15/006 |
| 2017/0247120 A1* | 8/2017 | Miller | | B64F 1/36 |
| 2017/0275025 A1* | 9/2017 | Johnson | | B64F 1/362 |
| 2017/0283090 A1* | 10/2017 | Miller | | B64C 39/024 |
| 2017/0316701 A1* | 11/2017 | Gil | | H04W 4/70 |
| 2017/0341776 A1* | 11/2017 | McClure | | B64D 47/08 |
| 2018/0134376 A1* | 5/2018 | Chen | | B64C 25/08 |

FOREIGN PATENT DOCUMENTS

| | | |
|---|---|---|
| CN | 104816834 A | 8/2015 |
| CN | 204688411 U | 10/2015 |
| CN | 205060008 U | 3/2016 |
| CN | 105667769 A | 6/2016 |
| CN | 105799946 A | 7/2016 |
| CN | 105857630 A | 8/2016 |
| CN | 205450781 U | 8/2016 |
| CN | 106516089 A | 3/2017 |
| DE | 4102271 A1 | 7/1992 |
| WO | 2013/186585 A1 | 12/2013 |
| WO | 2016/022482 A1 | 2/2016 |
| WO | 2016/115574 A1 | 7/2016 |

OTHER PUBLICATIONS

International Search Report dated Jan. 24, 2018; PCT/CN2017/107360.

\* cited by examiner

UNMANNED AERIAL VEHICLE

CROSS REFERENCE

This application is a continuation of International Application No. PCT/CN2017/107360, filed on Oct. 23, 2017, which claims priority to Chinese Patent Application No. 201610962576.5, filed on Oct. 28, 2016, both of which are hereby incorporated by reference in their entireties.

TECHNICAL FIELD

The present application relates to the field of unmanned aerial vehicles, and in particular, to an unmanned aerial vehicle.

RELATED ART

An aerial photo captured by an unmanned helicopter has advantages of large scale, wide viewing angle and high currency. Currently, aerial photography of an unmanned aerial vehicle is widely applied to fields such as military reconnaissance, national ecological environment protection, mineral resources exploration, marine environment surveillance, land use investigations, water resources development, crop condition monitoring and evaluation, agricultural work, natural disaster monitoring and evaluation, city planning and municipal administration, forest pest and disease prevention and monitoring, public safety, national defense, digital earth, and advertising photography, and has large market demands.

To perform panoramic shooting, a panoramic shooting unmanned aerial vehicle needs to prevent the camera from being blocked by a landing gear. In the prior art, the camera is generally extended downward to be located under the landing gear, so as to avoid the landing gear of the unmanned aerial vehicle. It is assumed that the height of the landing gear of the unmanned aerial vehicle is approximately, for example, 15 cm. In consideration of volumes of the camera and a gimbal, the camera and the gimbal need to be moved for a long distance, so that the camera can completely extend out from the lower part of the landing gear. This requires a long expansion lever located right below a vehicle body or the unmanned aerial vehicle, and the expansion lever needs to be hidden inside the vehicle body. Therefore, a channel that is approximately 15 cm in length from top to bottom needs to be reserved in the center of the entire vehicle body. However, generally, components such as a battery and a main board are disposed in the center of the vehicle body. This solution is actually very difficult to implement in engineering and occupies relatively large space of the vehicle body of the unmanned aerial vehicle.

To avoid blocking a viewing angle of panoramic shooting of the unmanned aerial vehicle, the length of a bracket for mounting a propeller may be shortened, for example, the bracket may be disposed above an arm of the unmanned aerial vehicle. However, in the prior art, the bracket is generally used as a supporting frame in landing of the unmanned aerial vehicle. After the bracket is disposed above the arm, how to implement takeoff and landing of the unmanned aerial vehicle becomes a technical problem that needs to be resolved urgently.

SUMMARY

A technical problem to be resolved in the present application is how to provide a new solution of takeoff and landing of an unmanned aerial vehicle.

According to a first aspect, an embodiment of the present application provides an unmanned aerial vehicle, including: a vehicle body, where the vehicle body includes a first positioning device; and a landing gear, where the landing gear can be detached from the vehicle body, and when the landing gear is detached from the vehicle body, the vehicle body determines a position of the landing gear by using the first positioning device.

Optionally, the landing gear is provided with a second positioning device, and the second positioning device is configured to exchange data with the first positioning device, so as to send position information of the landing gear to the first positioning device.

Optionally, there are multiple second positioning devices separately disposed at a top of the landing gear according to a preset interval.

Optionally, the first positioning device exchanges data with the second positioning device by means of any of or any combination of Bluetooth, wireless fidelity (WiFi), a radio wave, and machine vision.

Optionally, the unmanned aerial vehicle further includes an image capture device, disposed on the vehicle body, and configured to capture an image or a video.

Optionally, the unmanned aerial vehicle further includes a transparent housing, where the image capture device is disposed in the transparent housing.

Optionally, a contour of the transparent housing matches the landing gear, and when the vehicle body is landing, the transparent housing is placed on the landing gear.

Optionally, the transparent housing is hemispheric, semielliptical, or semi-polyhedral.

Optionally, the landing gear has a groove, and the groove is configured to provide a place for parking of the vehicle body.

Optionally, a shape of the groove matches a shape of the transparent housing.

Optionally, the groove is arc-shaped.

Optionally, the landing gear is of a rectangular structure or a cylinder structure, and the groove is disposed downward from the top of the landing gear.

Optionally, there are multiple first positioning devices separately disposed along an outer edge of the image capture device.

Optionally, the image capture device includes a panoramic camera and/or a multi-view camera.

The technical solution of the present application has the following advantages:

According to the unmanned aerial vehicle provided in the embodiments of the present application, because the landing gear can be detached from the vehicle body and the vehicle body can determine the position of the landing gear by using the first positioning device, the unmanned aerial vehicle, when performing a flight mission, is not affected by the weight of the landing gear, avoiding that the landing gear blocks the image capture device and implementing convenient takeoff and landing.

In an optional technical solution, the vehicle body of the unmanned aerial vehicle is provided with the first positioning device. The landing gear is provided with the second positioning device, and the second positioning device is configured to exchange data with the first positioning device, so as to send position information of the landing gear to the first positioning device. Therefore, when the unmanned aerial vehicle is landing or parking, the landing gear can be effectively positioned.

BRIEF DESCRIPTION OF THE DRAWINGS

To illustrate technical solutions in specific implementations of the present application or in the prior art more clearly, the following briefly describes the accompanying drawings required for describing the specific implementations or the prior art. Apparently, the accompanying drawings in the following description show some implementations of the present application, and a person of ordinary skill in the art may still derive other drawings from these accompanying drawings without creative efforts.

DETAILED DESCRIPTION

The technical solution of the present application is clearly described below with reference to the accompanying drawings. Apparently, the embodiments to be described are merely some rather than all of the embodiments of the present application. All other embodiments obtained by a person of ordinary skill in the art based on the embodiments of the present application without creative efforts shall fall within the protection scope of the present application.

In the description of the present application, it should be noted that directions or position relationships indicated by terms such as "center", "above", "below", "left", "right", "vertical", "horizontal", "inside", and "outside" are directions or position relationships based on the accompanying drawings. The terms are merely used for ease of description and simplification of the present application, but are not intended to indicate or imply that an indicated apparatuses or element necessarily has a particular direction and is constructed and operated in a particular direction, and therefore, cannot be understood as limitations to the present application. In addition, terms such as "first", "second" and "third" are merely used to describe objectives and cannot be understood as indicating or implying relative importance.

In the description of the present application, it should be noted that unless otherwise explicitly stated, terms such as "mount", "connected" and "connection" should be understood in a broad sense. For example, "connection" may be: a fixed connection, a detachable connection, or an integrated connection; a mechanical connection or an electric connection; a direct connection or an indirect connection by means of a medium; inner communication between two elements; or a wireless connection or a wired connection. A person of ordinary skill in the art may understand a specific meaning of the foregoing terms in the present application according to specific conditions.

In addition, technical characteristics described in the following and involved in different implementations of the present application may be mutually combined as long as they do not conflict with each other.

Figure 1:
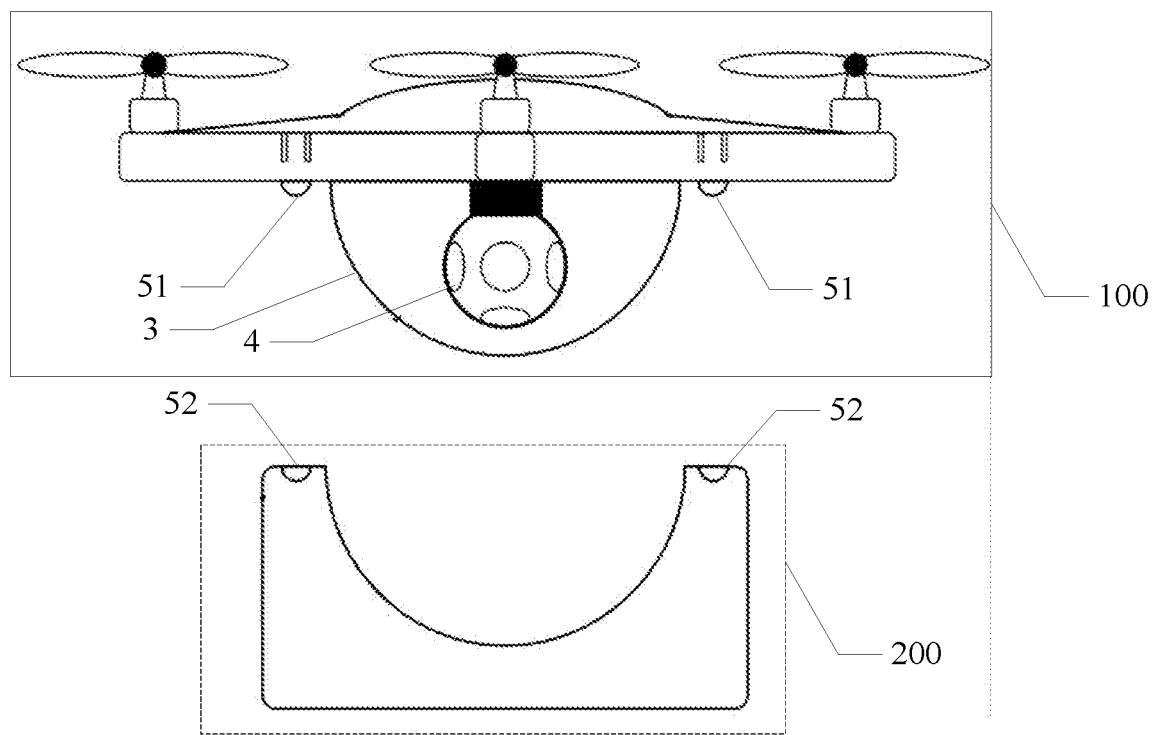
FIG. 1 is a schematic diagram of an unmanned aerial vehicle according to an embodiment of the present application.
Figure 2:
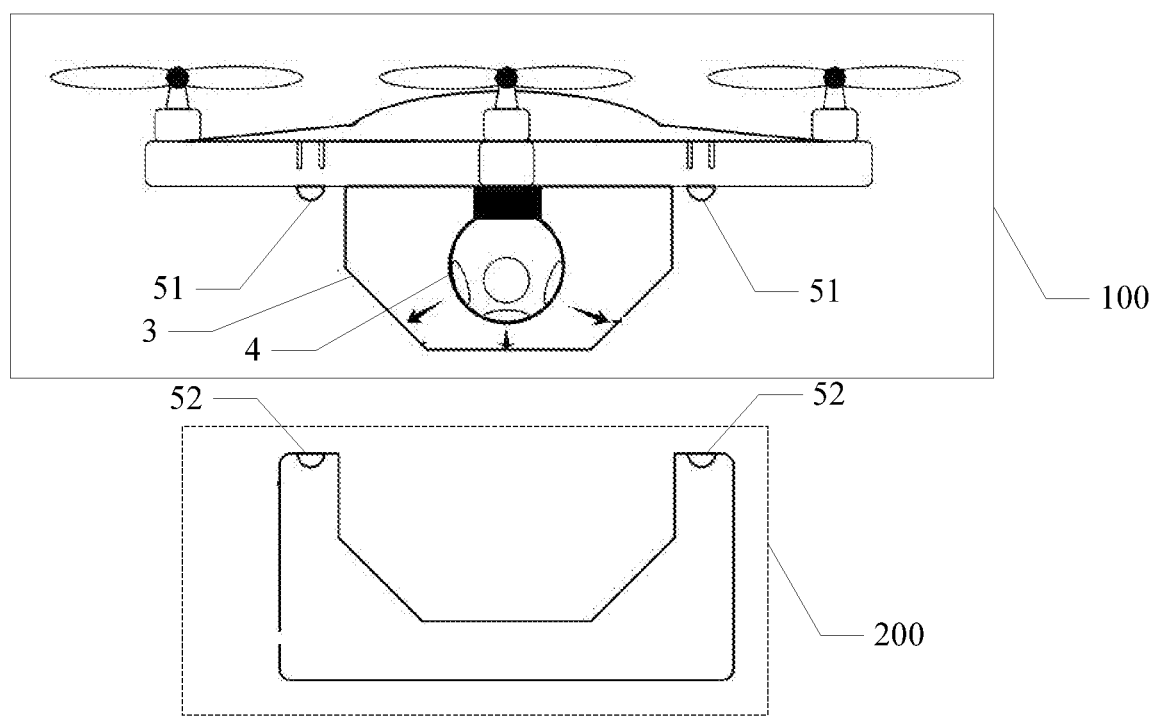
FIG. 2 is a schematic diagram of another unmanned aerial vehicle according to an embodiment of the present application.

An unmanned aerial vehicle is disclosed in an embodiment. Referring to FIG. 1 and FIG. 2, FIG. 1 and FIG. 2 show schematic structures of the unmanned aerial vehicle. The unmanned aerial vehicle includes a vehicle body 100 and a landing gear 200.

The vehicle body 100 is configured to accommodate components of the unmanned aerial vehicle, for example, a battery, an engine (motor), and a camera. In this embodiment, the vehicle body 100 includes a first positioning device 51.

The landing gear 200 can be detached from the vehicle body 100, and when the landing gear 200 is detached from the vehicle body 100, the vehicle body 100 determines a position of the landing gear 200 by using the first positioning device 51. In a specific embodiment, the first positioning device 51 may be implemented in an active capture manner, for example, machine vision; or the first positioning device 51 may be implemented in a passive capture manner. For example, position information of the landing gear 200 is received by using a position receiving device.

To implement more accurate positioning between the vehicle body 100 and the landing gear 200, in a specific embodiment, referring to FIG. 1 and FIG. 2, the landing gear 200 is provided with a second positioning device 52. The second positioning device 52 is configured to exchange data with the first positioning device 51, so as to send the position information of the landing gear 200 to the first positioning device 51. In a specific embodiment, the second positioning device 52 may be implemented by using a signal transmit device, so as to send the position information of the landing gear 200 to the first positioning device 51. In a specific embodiment, the first positioning device 51 exchanges data with the second positioning device 52 by any of or any combination of Bluetooth, WiFi, a radio wave, and machine vision. Specifically, when the vehicle body 100 is about to land and a preset distance is reached, the second positioning device 52 may send position coordinate information of the landing gear 200 to the first positioning device 51 in a manner of wireless communication, so that the vehicle body 100 may position the landing gear 200 according to the position coordinate information, so as to land on the landing gear 200.

It should be noted that, when data is exchanged by means of machine vision, the landing gear may be roughly positioned by using the Global Positioning System (GPS). When the vehicle body of the unmanned aerial vehicle is located above the landing gear by a distance, accurate positioning is performed by using a visual positioning system, so that the vehicle body of the unmanned aerial vehicle accurately lands on the landing gear; or the vehicle body of the unmanned aerial vehicle is controlled, by using a remote control, to be located above the landing gear by a distance, and then accurate positioning is performed by using a visual positioning system, so that the vehicle body of the unmanned aerial vehicle accurately lands on the landing gear.

In an optional embodiment, the unmanned aerial vehicle may further include an image capture device 4. The image capture device 4 is disposed on the vehicle body 100, for example, a bottom end of the vehicle body 100, and is configured to capture an image or a video, for example, may be configured to determine the position and/or a shape of the landing gear 200. Specifically, the machine vision may be implemented by using the image capture device 4. Certainly, in a specific embodiment, the image capture device 4 may be further configured to perform panoramic shooting. In an example, the image capture device 4 may include a multi-view camera or a panoramic camera, or may include both a multi-view camera and a panoramic camera, to collect a multi-angle image/video.

In an optional embodiment, the unmanned aerial vehicle may further include a transparent housing 3. In a specific embodiment, the image capture device 4 is disposed in the transparent housing 3, so that the image capture device 4 collects outside image information through the transparent housing 3. In a specific embodiment, a viewing angle of the image capture device 4 matches a shape of the transparent housing 3. Specifically, when the transparent housing 3 is hemispheric, a facing direction of the image capture device 4 may be arbitrarily set because a sphere has no corner angle.

When the transparent housing 3 is semi-polyhedral, each viewing angle of the image capture device 4 may correspondingly face each plane of the transparent housing 3. It may be understood that in other embodiments, the transparent housing 3 may have other shapes, such as a semielliptical shape, as long as the image capture device 4 is not affected in video or image capture.

To further improve the communication effect, in an optional embodiment, there are multiple first positioning devices 51 separately disposed at a bottom of the vehicle body according to a preset interval. Preferably, the first positioning devices 51 are disposed along an outer edge of the image capture device 4. There are multiple second positioning devices 52 separately disposed at a top of the landing gear 200 according to a preset interval.

In an optional embodiment, a contour of the transparent housing 3 matches the landing gear 200, and when the vehicle body 100 is landing, the transparent housing 3 is placed on the landing gear 200. Specifically, an upper part of the landing gear 200 is provided with a groove used to provide a place for parking of the vehicle body. In an optional embodiment, a shape of the groove matches a shape of the transparent housing 3. The groove is used to support the transparent housing 3 for parking of the unmanned aerial vehicle. In a specific embodiment, the transparent housing of the unmanned aerial vehicle is supported by the groove on the upper part of the landing gear 200, and therefore, can bear the weight of the unmanned aerial vehicle, thereby providing a place for parking of the unmanned aerial vehicle.

In an optional embodiment, the landing gear 200 is of a rectangular structure and the groove is disposed downward from the top of the landing gear. A cross section of the groove is arc-shaped (as shown in FIG. 1, a stereoscopic shape of the groove is hemispheric or semielliptical) or polygon-shaped (as shown in FIG. 2, the stereoscopic shape of the groove is semi-polyhedral). In a specific embodiment, the first positioning device 51 can further determine a position of the landing gear 200 by visually recognizing a structure of the landing gear 200. It may be understood that in other embodiments, the landing gear 200 may have other shapes, such as a cylinder shape. This is not strictly limited herein, as long as the vehicle body 100 can be conveniently parked.

According to the unmanned aerial vehicle provided in the embodiments, because the landing gear 200 can be detached from the vehicle body 100 and the vehicle body 100 can determine the position of the landing gear 200 by using the first positioning device 51, the unmanned aerial vehicle, when performing a flight mission, is not affected by the weight of the landing gear, avoiding that the landing gear 200 blocks the image capture device 4 and implementing convenient takeoff and landing.

In an optional technical solution, the vehicle body 100 of the unmanned aerial vehicle is provided with the first positioning device 51. The landing gear 200 is provided with the second positioning device 52, and the second positioning device 52 is configured to exchange data with the first positioning device 51, so as to send the position information of the landing gear 200 to the first positioning device 51. Therefore, when the unmanned aerial vehicle is landing or parking, the landing gear can be effectively positioned.

In the present application, the first positioning device 51 and the second positioning device 52 are sensors that can implement a positioning function.

Obviously, the foregoing embodiments are merely examples used for clear description, but are not limitations to implementations. For a person of ordinary skill in the art, other variations or modifications in different forms may be made based on the foregoing description. All implementations do not need to and cannot be listed herein. In addition, obvious derived variations or modifications shall fall within the protection scope of the present application.

What is claimed is:

1. An unmanned aerial vehicle, comprising:
a vehicle body comprising a first positioning device;
a landing gear configured to detach from the vehicle body,
wherein when the landing gear is detached from the vehicle body, the vehicle body determines a position of the landing gear by using the first positioning device, and
wherein the landing gear has a groove configured to provide a place for parking of the vehicle body;
wherein the vehicle body further comprises a transparent housing having a shape matches a shape of the groove; and
wherein the groove supports the transparent housing for the parking of the vehicle body.

2. The unmanned aerial vehicle according to claim 1, wherein the landing gear is provided with a second positioning device, and the second positioning device is configured to exchange data with the first positioning device to send position information of the landing gear to the first positioning device.

3. The unmanned aerial vehicle according to claim 2, wherein multiple second positioning devices are separately disposed at a top of the landing gear according to a preset interval.

4. The unmanned aerial vehicle according to claim 2, wherein the first positioning device exchange data with the second positioning device by means of any of or any combination of Bluetooth, wireless fidelity (WiFi), a radio wave, and machine vision.

5. The unmanned aerial vehicle according to claim 1, further comprising: an image capture device, disposed on the vehicle body, and configured to capture an image or a video.

6. The unmanned aerial vehicle according to claim 5, wherein the image capture device is disposed in the transparent housing.

7. The unmanned aerial vehicle according to claim 6, wherein a contour of the transparent housing matches the landing gear, and when the vehicle body is landing, the transparent housing is placed on the landing gear.

8. The unmanned aerial vehicle according to claim 6, wherein the transparent housing is hemispheric, semielliptical, or semi-polyhedral.

9. The unmanned aerial vehicle according to claim 1, wherein a cross section of the groove is arc-shaped.

10. The unmanned aerial vehicle according to claim 1, wherein the landing gear is of a rectangular structure or a cylinder structure, and the groove is disposed downward from the top of the landing gear.

11. The unmanned aerial vehicle according to claim 5, wherein multiple first positioning devices are separately disposed along an outer edge of the image capture device.

12. The unmanned aerial vehicle according to claim 5, wherein the image capture device comprises a panoramic camera.

13. The unmanned aerial vehicle according to claim 5, wherein the image capture device comprises a multi-view camera.

14. The unmanned aerial vehicle according to claim 5, wherein the image capture device comprises a panoramic and a multi-view camera.

\* \* \* \* \*